US005105622A

United States Patent [19]

Lindner

[11] Patent Number: 5,105,622

[45] Date of Patent: Apr. 21, 1992

[54] HYDRAULIC UNIT FOR DRIVING A TOOL

[75] Inventor: Dietmar Lindner, Königsfeld, Fed. Rep. of Germany

[73] Assignee: FAG Kugelfischer, Fed. Rep. of Germany

[21] Appl. No.: 588,366

[22] Filed: Sep. 26, 1990

[30] Foreign Application Priority Data

Sep. 28, 1989 [DE] Fed. Rep. of Germany ....... 3932354

[51] Int. Cl.[5] ........................ F16D 31/02; F15B 11/00

[52] U.S. Cl. ........................................ 60/473; 91/444; 91/465; 91/428

[58] Field of Search ......................... 60/325, 385, 473; 91/391 R, 428, 432, 437, 442, 444, 448, 462, 465, 466; 92/75

[56] References Cited

U.S. PATENT DOCUMENTS

| | | | |
|---|---|---|---|
| 2,372,393 | 3/1945 | Ray | 91/444 |
| 3,875,850 | 4/1975 | Reynolds et al. | 91/462 |
| 4,149,450 | 4/1979 | Schleicher | 91/466 |
| 4,343,228 | 8/1982 | Wallis | 91/448 |
| 4,513,979 | 4/1985 | Silverman | 91/437 |

FOREIGN PATENT DOCUMENTS

| | | | |
|---|---|---|---|
| 2524005 | 5/1975 | Fed. Rep. of Germany | 60/473 |
| 3603109 | 8/1987 | Fed. Rep. of Germany . | |
| 7812497 | 6/1979 | Netherlands | 91/462 |

*Primary Examiner*—Edward K. Look
*Assistant Examiner*—Hoang Nguyen
*Attorney, Agent, or Firm*—Ostrolenk, Faber, Gerb & Soffen

[57] ABSTRACT

A hydraulic cylinder has a piston in it with a rod projecting out of the cylinder and connectable with a tool which is operable by movement of the piston rod. A high pressure space is defined in the cylinder at one side of the piston and a low pressure space is defined at the other side of the piston. A partition defines the other end of the low pressure space. A diaphragm on the other side of the partition defines an equalizing space between the diaphragm and the partition. A low pressure line is in communication with the low pressure space and with the equalizing space. A change over valve in the lines to both the high pressure space and the low pressure space enables connection of high pressure from a pump either to one space or to the other space in the cylinder while always permitting communication from the low pressure line to the equalizing space, the connection to the equalizing space is in the low pressure line between the change over valve and a non-return valve at the pump.

12 Claims, 4 Drawing Sheets

HYDRAULIC UNIT FOR DRIVING A TOOL

BACKGROUND OF THE INVENTION

The present invention relates to a hydraulic cylinder and a hydraulic circuit for driving a tool, such as a cutting or stripping knife or spreader arm, which is useful, for example, for enlarging an opening in sheet metal material and to a hydraulic control circuit for operating the cylinder.

In cooperation with tools such as those used in rescue apparatus, as in U.S. Ser. No. 561,190, filed Aug. 1, 1990, entitled "Hydraulically Operated Stripping Device" (F-8187), incorporated herein by reference, it is necessary to make available a functioning total unit including hydraulic cylinder, pump, valves and a cutting and spreading tool within the smallest structural space and to be able to provide a maximum force using this unit.

In a mobile installation, the cylinder is activated by a hand pump. Since the stroke volume of the pump is much smaller than the active volume of the cylinder that is supplied by the pump, hydraulic fluid must be conveyed from an intermediate tank for operating the cylinder. Such units are distributed by FAG Kugelfischer Georg Schafer KGaA, the assignee hereof, under the designation Lukas LKS 35.

In addition to the large amount of space which is required for the separately operated units, there is the disadvantage that the unit cannot be operated in any desired orientation but only the orientations in which the hydraulic fluid covers the intake opening of the pump. Particularly under the frequently rough conditions experienced when the hydraulic system is used in a rescue operation, valuable time may be lost because a suitable operating location must be found for setting up the unit to orient it in order to assure that the pump does not draw in air.

Federal Republic of Germany Published Application OS 36 03 109 discloses a hydraulic hand pump for actuating cable shoe presses and other hydraulic tools. In that case, the working cylinder and the hydraulic pump are arranged coaxially in a common housing. The working cylinder has a high pressure space, while the hand pump comprises a low pressure cylinder having a low pressure piston displaceably arranged within it. There is a concentric bore in the low pressure piston within which is arranged a high pressure piston which defines the limitation of a high pressure cylinder that is present in the low pressure piston. In front of the pump, a pressure fluid supply container is arranged on the housing. That supply container is defined by a flexible diaphragm and is in communication via valves with the low pressure space of the hand pump. That supply container contains the entire volume of hydraulic fluid necessary for operating the hydraulic tool. The diaphragm present in the supply container assures that the intake connection of the pump is surrounded by hydraulic fluid in any position of the unit which avoids the drawing in of air. Since the complete working volume must be stored in the supply tank, the space required in the case of this pump is also high. When high forces are employed and large strokes of the cylinder are required, as are necessary in rescue devices, the unit shown in Federal Republic of Germany OS 36 03 109 is of excessive length so that it is difficult for the operator to handle.

SUMMARY OF THE INVENTION

It is therefore the object of the present invention to provide a hydraulic unit for driving a tool, which is compact in shape and construction, which can produce high forces and in which dependable suction or intake of the pump is assured in any position and orientation of the entire unit.

Another object is to provide a suitable hydraulic circuit with which the cylinder of the invention can be operated.

The invention concerns a hydraulic unit comprised of a hydraulic cylinder and a hydraulic circuit in communication with the cylinder. The cylinder has an internal pressurizable bore. A piston located in the cylinder is shiftable axially along the cylinder. The piston divides the cylinder into a low pressure space at one side of the piston and a high pressure space at the opposite side of the piston. A piston rod connected to the piston extends from the piston axially through the cylinder, through one of the pressure spaces, and then out of the cylinder. The piston rod is connectable outside the cylinder with a tool, such as pressing jaws. The motion of the piston rod through movement of the piston along the cylinder operates the connected tool.

Toward one end, and typically at the end of the cylinder away from the tool and the piston rod, there is a partition which is spaced from and which defines, with the piston, one of the pressure spaces.

There is a flexible diaphragm extending across and closing the cylinder. The diaphragm is located on the other side of the partition from the piston. The diaphragm defines a second low pressure space, and particularly an equalizing space, in the cylinder between the partition and the diaphragm and the diaphragm inherently applies pressure on the equalizing space. On its side away from the partition, the diaphragm communicates to the atmosphere. The diaphragm either is self-biased or with the assistance of a spring is biased toward the partition.

There is a hydraulic pump for generating hydraulic pressure. There is a first connection from the pump to the high pressure space and a second connection from the pump to the low pressure space. The connection to the low pressure space is a low pressure line. There is a connection between the low pressure line and the equalizing space. The equalizing space has a volume that corresponds at least to the sum of the displacement volume of the piston rod, when the piston is as fully as possible inserted into the cylinder up to the partition, plus the compression volume of the hydraulic fluid in the cylinder plus the stroke volume of the pump.

A one-way valve from the pump delivers high pressure fluid through the first connection to the high pressure space. The pump is a periodically or spurt operating pump, e.g. a hand operated pump.

A non-return valve to the pump prevents return of fluid from the low pressure space through the second connection to the pump. There is a change over valve connected in series with both the low pressure line and the high pressure line. That valve has a first position which enables communication from the outlet from the pump through the change over valve to a first one of the pressure spaces, which becomes the high pressure space, and which enables communication from the other second pressure space, which becomes the low pressure space, to the non-return valve of the pump. The non-return valve prevents fluid return into the pump and also enables communication from the low pressure space through a connection between the change over and non-return valves to the equalizing space.

The change over valve has a second position where it reverses the connections to the pressure spaces so as to enable communication from the outlet from the pump to the second pressure space, which becomes the high pressure space, and to enable communication from the first pressure space, which becomes the low pressure space, through the change over valve to the non-return valve which blocks fluid return to the pump. In the second position, the communication from the high pressure space to the non-return valve, through the change over valve, is again past the connection to the equalizing space. By the subdivision of the cylinder space about the piston into a high pressure space and a low pressure space so that the enlargement of the one always results in a reduction of the size of the other and a change in size of the equalization space based upon the amount of hydraulic fluid corresponding to the displacement volume of the retracted piston rod, the compression volume of the hydraulic fluid and the stroke volume of the hand pump, a separate hydraulic fluid supply container can be completely dispensed with. For operation, only the hydraulic fluid present in the low pressure spaced is used.

Other objects, features and advantages of the present invention will become apparent from the following description of the invention which refers to the accompanying drawings.

DESCRIPTION OF THE PREFERRED EMBODIMENTS

Figure 1:
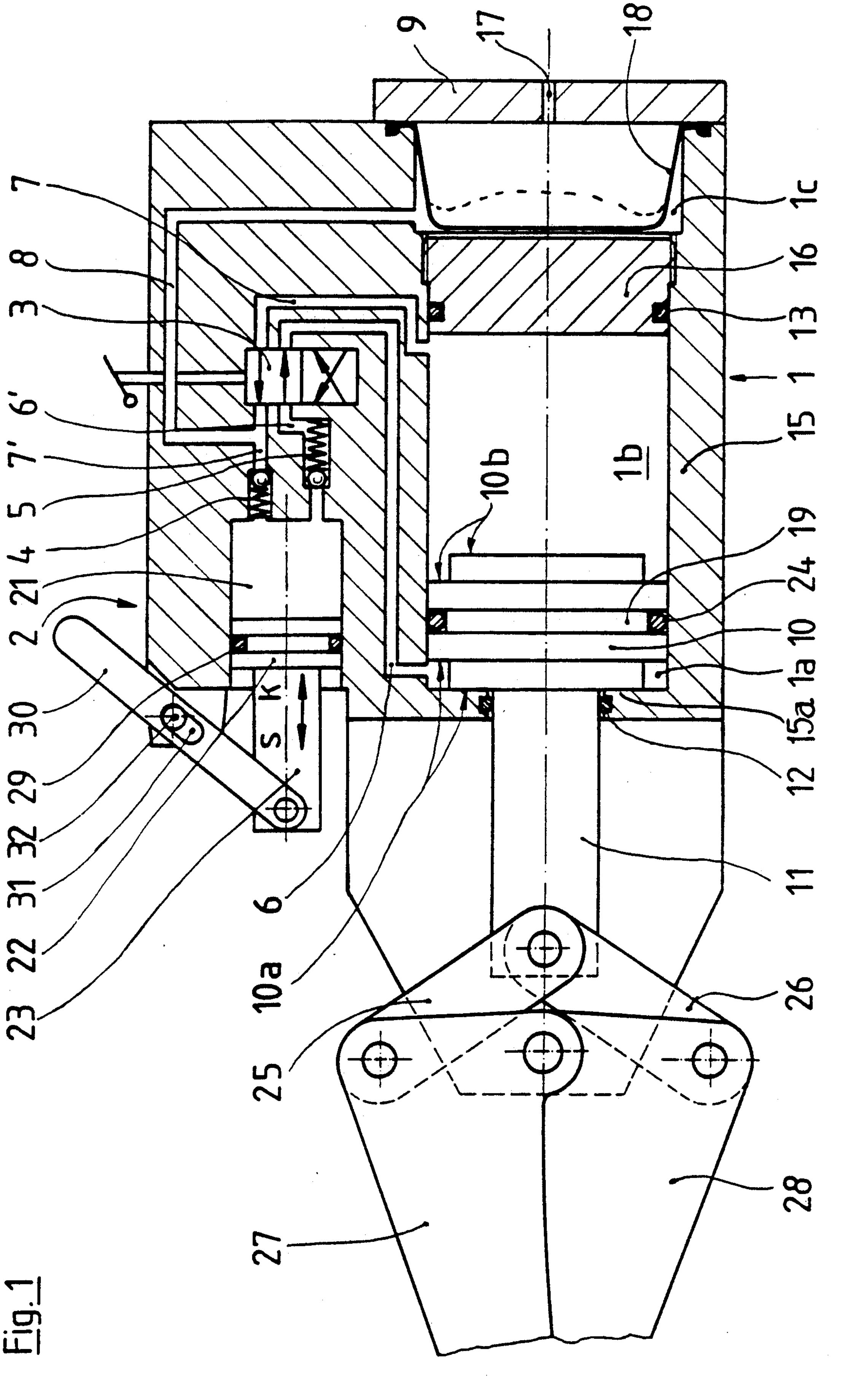
FIG. 1 diagrammatically shows an overall arrangement according to the invention with the hydraulic cylinder during the load phase.

The hydraulic cylinder 1 and the piston pump 2 for pressurizing the cylinder are arranged in a common housing 15. Of course, use of two separate housings is also possible.

For the operability of the entire unit during filling, both piston 10 of cylinder 1 and piston 22 for the pump 2 are in their extracted positions and an additional quantity of hydraulic fluid, which corresponds to the compression volume of the hydraulic fluid, is fed to the equalizing space 1*c*.

The piston 10 is mounted in a sliding manner within the hydraulic cylinder 1. The piston rod 11 is attached to the piston 10 and extends out of an end of the housing 15. The rod passes through the below described cylinder space 1*a*. The piston 10 has a circumferential groove 19 into which a sealing ring 24 is inserted which engages the internal bore of the cylinder 1. This creates two different variable volume pressure spaces la and lb on both opposite sides of the piston 10. The volume of the spaces la and lb depends on the instantaneous position of the piston 10 within the cylinder housing 15.

The pressure space la, which can be acted on by high pressure, is defined by the piston base 10*a* and the cylinder bottom 15*a*. The pressure space 1*b*, which can be acted on by low pressure, is defined by the piston bottom 10*b* and by the partition 16 which is active in the cylinder 1 and is axially spaced from the piston. The partition 16 is spaced at a distance from the cylinder cover 9. Together with the cover, the partition 16 forms an enclosed space within the hydraulic cylinder 1.

A diaphragm 18 is arranged between the partition 16 and the cylinder cover 9. The diaphragm is sealed to the cover so that a variable volume equalizing space 1*c* is created by the diaphragm 18 and the partition 16. The pressure spaces 1*a* and 1*b*operatively communicate with the hand pump 2 via respective hydraulic lines 6 and 7. In one position of the below described change over valve 3 the line 6 is a high pressure line from the pump and the line 7 is a low pressure line to the pump. A further low pressure line 8 communicates into the equalizing space 1*c*. The line 8 leads from the low pressure line 7 to the equalizing space 1*c* and is connected to the low pressure line between the non-return valve 4 and the below described change over valve 3.

The conventional diaphragm 18 is so arranged in the cylinder 1 that in its relaxed position of FIG. 1, the diaphragm extends close to the partition 16 and cuts off the exit of the line 8 from connection 17 with the atmosphere which is present in the cylinder cover 9. The diaphragm 18 must, in this case, be so arranged that the volume of the equalizing space 1*c*, which forms between the diaphragm and the partition 16 in the loaded condition of the diaphragm 18, is at least the volume of the piston rod 11, when the rod is completely introduced into the cylinder 1 with the piston 10 over to the partition 16, plus the compression volume of the hydraulic fluid upon maximum introduction of force, plus the stroke volume (the delivery quantity) of the hand pump 2.

The partition 16 and/or the equalizing space 1*c* can be formed in the cylinder 1 relatively simply and effectively by a plug which can be screwed into the cylinder bore. At its end facing the piston bottom 10*b*, the plug 16 is provided with a radial sealing ring 13 which assures that no hydraulic fluid can escape out of the low pressure space 1*b* into the equalization space 1*c*.

Figure 2:
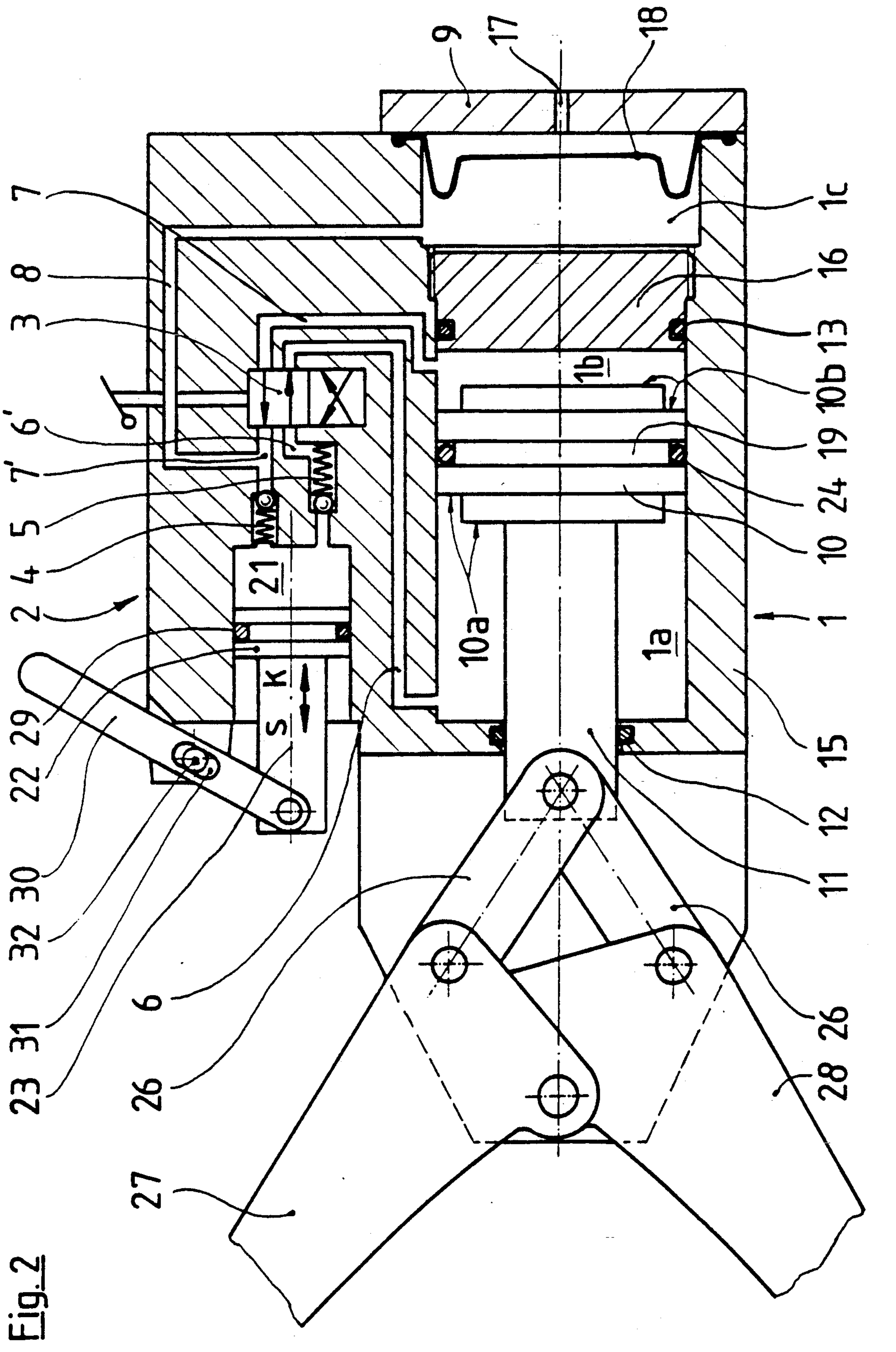
FIG. 2 shows the arrangement of FIG. 1 with the hydraulic cylinder under full load.
Figure 3:
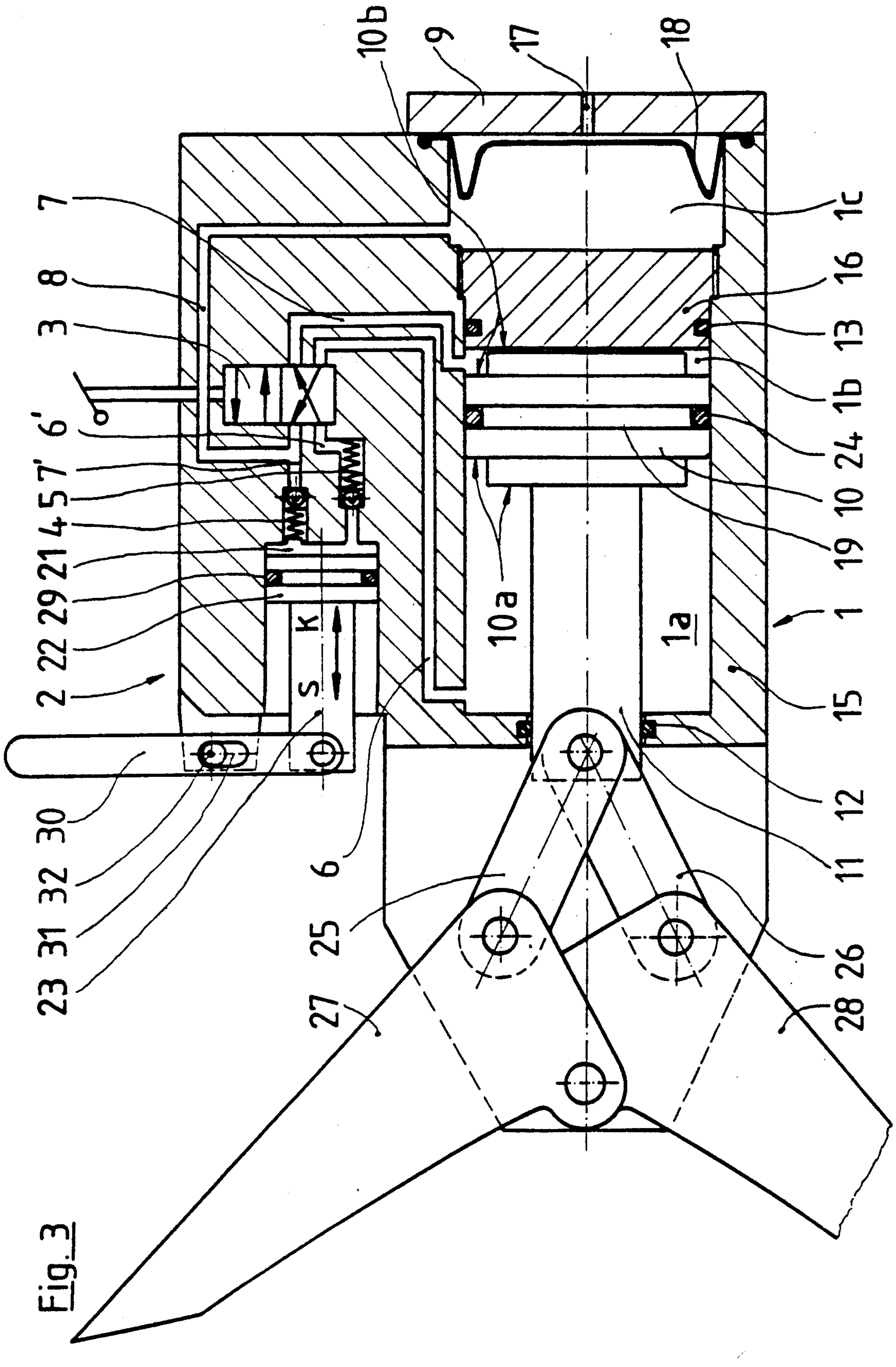
FIG. 3 shows that arrangement at the start of the relief phase.

At the end of the piston rod 11 facing away from the piston 10, a tool operated by the piston rod 11, and particularly a spreader 27, 28, which is only partially shown, is attached to the rod 11 by two links 25, 26 in such a manner that the arms 27, 28 of the spreader are caused to move apart when the piston rod 11 moves into the cylinder 1, as can be seen in the progression through FIGS. 1, 2 and 3. Links can be alternatively arranged to bring edges together upon movement of the piston rod into the cylinder 15, e.g. if the arms 27 and 28 were together to serve as a cutter. The hand operated pump 2 is a conventional piston pump having a smaller stroke volume than that of the hydraulic cylinder 1. The hand pump 2 includes a cylinder space 21 in which the pump piston 22 is mounted in known manner for sliding, and the piston is sealed by a sealing ring 29. The piston rod 23 attached to the pump piston 22 has, at its end facing away from the piston 22, an articulated pump lever 30, which is slidingly guided by means of a slot 31 arranged approximately in the middle of its length on a bolt 32 that is fixed on the housing 15. The selection of the size of the piston pump 2 depends on the maximum number of pump strokes by which the cylinder 1 can be brought from its retracted position into its extended position.

From the cylinder 1, the high pressure line 6 and the low pressure line 7 lead to the change over valve 3, which is developed as 4/2-way valve (four paths in two positions), and the lines 6′ and 7′ lead from the change over valve 3 via the non-return valves and 5 integrated to the hand pump 2. The non-return valves 4, 5 are, in this connection, arranged in such a manner that the flow of the fluid to the hand pump 2 can take place only via the line 7′ and the flow from the hand pump 2 only via the line 6′. Between the nonreturn valve 4 and the change over valve 3 the additional low pressure line 8, as already mentioned, communicates into the equalizing space 1*c*, after it branches off the line 7′. The change over valve determines which space 1*a* or 1*b* will be the high pressure space.

The operation of the above arrangement is now described. FIG. 1 shows the hydraulic cylinder in the basic position, wherein the piston 10 has not yet moved over any distance and therefore is still in the position of rest. The change over valve 3 is shown switched such that hydraulic fluid can pass from the hand pump 2 via the non-return valve 5 and line 6′ into the line 6 and from there into the high pressure space la of the cylinder 1.

Additional pumping on the lever 30 of the hand pump 2 conducts the hydraulic fluid present at the time in the pressure space 21 via each compression stroke, in the direction k, into the high pressure space 1*a* of the cylinder 1, so that the piston 10 moves to the right for enlarging space 1*a* and space 1*b*. At the same time, the volume of hydraulic fluid displaced by the piston 10 flows from the low pressure space 1*b* via the lines 7, 7′. But since the non-return valve 4 is blocked by the buildup of pressure in the pressure space 21 of the pump 2, the flow instead is bypassed via the line 8 into the equalizing space 1*c*.

Figure 4:
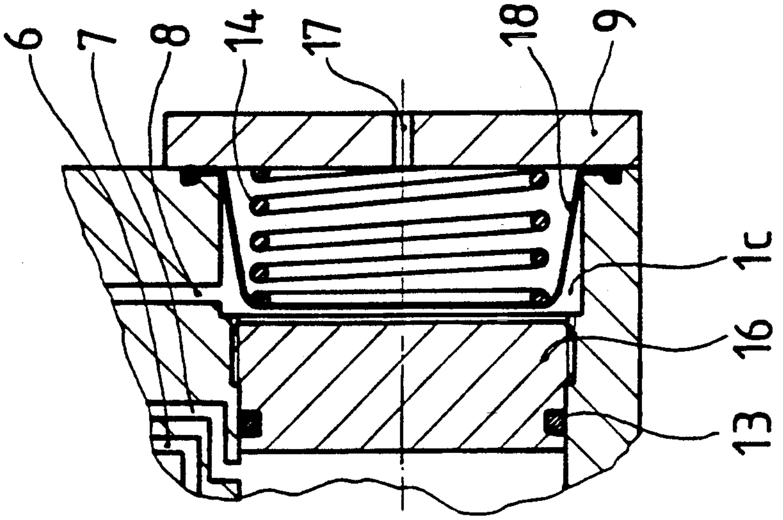
FIG. 4 is a partial showing of a further embodiment of the hydraulic cylinder.

At the end of the compression stroke, the diaphragm 18 is deformed to assume the position shown in dashed line in FIG. 1. The volume then enclosed by the diaphragm 18 and the partition 16 corresponds to the volume pumped by the hand pump 2, plus the displacement volume of that part of the piston rod 11 which has entered the cylinder space la plus the compression volume of the hydraulic fluid. The compression volume of the hydraulic fluid can be obtained again only from the equalization space 1*c* since it is furthermore required in the cylinder space 1*a* for the build up of pressure. Since the diaphragm 18, on the other hand, is in operative communication with the atmosphere via the connection 17, only the pressure applied by the elastic force of the diaphragm to the hydraulic fluid acts in the lines 7, 7′ and 8. If the inherent elastic force of the diaphragm 18 is not sufficient, then as shown in FIG. 4, a compression spring 14 can be additionally provided. The spring 14 rests at one end against the cylinder cover 9 and at the other end against the side of the diaphragm 18 which faces away from the equalizing space 1*c*.

Upon the subsequent suction stroke, in the direction S, of the hand pump 2, the non-return valve 4 opens so that the volume present in the equalizing space 1*c* flows back via the lines 8, 7′ into the pressure space 21 of the pump. At the same time, the spring loaded valve 5 blocks the high pressure line 6′ so that the piston 10 retains its shifted position. This process is repeated until the piston 10 has assumed the end position shown in FIG. 3. The spreading arms 27, 28 are then completely separated. Where the hydraulic device is used to tear open holes in sheet material, the fully separated position is the objective.

If a suction stroke is finally carried out, then the equalizing space 1*c* contains the same quantity of hydraulic fluid as corresponds to the volume of the piston rod 11 when it is completely introduced into the pressure space 1*a*, less the compression volume. This quantity of hydraulic fluid, which is present in the 10. equalizing space 1*c*, is required in order to be able to move the piston 10 again completely into its other end position, since the maximum accomodatable volume of hydraulic fluid (right end position of the piston) of the high pressure space 1*a* is smaller by the volume of the piston rod 11 plus the compression volume of the hydraulic fluid than the maximum volume of the low pressure space 1*b* (left end position of the piston).

Here the equation applies: $V_{1a}=V_{1b}-V_{kst}+V_{comp}$ in which:

- $V_{1a}$ is the maximum accomodatable volume of hydraulic fluid in the high pressure space 1*a* when the piston 10 is completely introduced and under load
- $V_{1b}$—is the volume of the low pressure space 1*b* with the piston rod 11 completely extended (basic position)
- $V_{ksr}$—is the volume of the completely retracted piston rod
- $V_{comp.}$—is the compression volume of the hydraulic fluid By switching the change over valve 3 to the up position of FIG. 3, the previous direction of flow in the lines 6 and 7 is changed so that hydraulic fluid moves into what had previously been the low pressure space 1*b* with each compression stroke of the piston 22 of the pump 2. The pressure space lb thereby becomes the high pressure space. Correspondingly, the pressure space 1*a* becomes the low pressure space. The piston 10 of the cylinder 1 is shifted in the direction toward its original position, toward the left in FIGS. 1 and 2. The equalizing space remains in communication with the low pressure line throughout. The compact construction of the cylinder cooperates with the pressure of the diaphragm 18 to furthermore assure that the connection or opening of the low pressure line 8 into the equalizing space 1*c* at the low pressure connection 14 is surrounded by hydraulic fluid in every position of the cylinder 1. This is useful for dependable suction, so that the piston pump 2 can thus exert suction.

The operation of the unit was explained using a spreading tool. Obviously, a cutting tool or a combination spreading-cutting tool can also be used. In the position of the change over valve 3 shown in FIG. 3, high pressure can also be built up in the cylinder space 1*b* so that the cylinder space 1*a* then becomes the low pressure space and the cylinder space 1*a* then the low pressure line. Accordingly, the tool which closes upon the extension of the piston rod 11 is then acted on by force.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A hydraulic unit for driving a tool, the unit comprising:

a cylinder with an interior bore that is pressurizable;

a piston located in the cylinder bore and movable along the axis of the cylinder, the piston dividing the cylinder bore into a low pressure space at one axial side of the piston and a high pressure space at the opposite axial side of the piston;

a piston rod connected to the piston and extending from the piston axially through a first one of the pressure spaces in the cylinder and then out of the cylinder; the piston rod being connectable outside the cylinder with a tool, and the motion of the piston rod, through movement of the piston axially through the cylinder, operates the connected tool;

a hydraulic pump for generating hydraulic pressure on hydraulic fluid in the cylinder bore, the pump having a stroke volume as it pumps; a first connection from the pump to the high pressure space, a second connection from the pump to the low pressure space, one of the first and second connections being a low pressure line;

an equalization space connected with the low pressure space in the cylinder, the equalization space having a volume corresponding at least to the sum of the displacement volume of the piston rod when it is as fully as possible introduced into the cylinder, plus the compression volume of the hydraulic fluid in the cylinder, plus the stroke volume of the pump.

2. The hydraulic unit of claim 1, further comprising a partition in the cylinder and defining with the piston one of the pressure spaces in the cylinder;

a flexible diaphragm extending across the cylinder and located on the other side of the partition from the piston, for defining the equalizing space in the cylinder between the partition and the diaphragm, the diaphragm also being adapted for applying pressure on the equalizing space.

3. The hydraulic unit of claim 2, wherein the equalization space and the low pressure space are arranged coaxially in the cylinder.

4. The hydraulic unit of claim 3, wherein the diaphragm has a side away from the partition, and the diaphragm side communicates with atmosphere.

5. The hydraulic unit of claim 4, further comprising a spring operating on the diaphragm for biasing the diaphragm toward the partition.

6. The hydraulic unit of claim 5, wherein the spring comprises a compression spring located on the diaphragm side away from the partition and supported to the cylinder for biasing the diaphragm.

7. The hydraulic unit of claim 3, wherein the partition comprises a plug which is insertable into and securable into the bore of the cylinder.

8. The hydraulic unit of claim 2, wherein the hydraulic pump includes an outlet valve from the pump for delivering high pressure fluid from the pump to the high pressure space, a non-return valve communicating with the pump and with the low pressure space for preventing return of fluid from the low pressure space to the pump and for directing such returning fluid to the equalization space.

9. The hydraulic unit of claim 8, further comprising a change over valve connected in series in both the low pressure line and the high pressure line, the change over valve having respective connections leading to the high pressure space and to the low pressure space;

the change over valve having first and second positions and in both of those positions its connections enable communication from the outlet valve from the pump through the change over valve to the high pressure space and enable communication from the low pressure space through the change over valve to the non-return valve of the pump, and the non-return valve blocks fluid return to the pump for communicating fluid from the low pressure space to the equalizing space;

in the first position of the change over valve, the pressure space at the opposite side of the partition from the equalization space and at one axial side of the piston is the low pressure space; in the second position of the change over valve, the pressure space on the other axial side of the piston is the low pressure space.

10. The hydraulic unit of claim 9, wherein the connection from the equalizing space to the low pressure space is connected to the low pressure line between the change over valve and the non-return valve.

11. The hydraulic unit of claim 9, wherein the pump is a pump which is operable to pump through pressure applying spurts.

12. The hydraulic unit of claim 11, wherein the pump is a hand operated pump.

* * * * *